United States Patent [19]

Luthi

[11] 3,794,178
[45] Feb. 26, 1974

[54] ROTARY DRUM FILTERING APPARATUS AND UNITARY DRAINAGE SECTORS THEREFOR

[75] Inventor: Oscar Luthi, Nashua, N.H.

[73] Assignee: Improved Machinery Inc., Nashua, N.H.

[22] Filed: Dec. 2, 1971

[21] Appl. No.: 204,103

[52] U.S. Cl. .............................................. 210/404
[51] Int. Cl. ............................................ B01d 33/06
[58] Field of Search ... 210/330, 400, 401, 402, 403, 210/404, 169

[56] References Cited
UNITED STATES PATENTS

| | | | |
|---|---|---|---|
| 3,419,150 | 12/1968 | Davis | 210/404 X |
| 1,892,306 | 12/1932 | Hillier | 210/404 |
| 3,516,544 | 6/1970 | Sesholtz | 210/169 |
| 3,386,584 | 6/1968 | Luthi | 210/404 |
| 3,175,691 | 3/1965 | Watson | 210/404 |
| 3,013,666 | 12/1961 | Krynski | 210/404 |
| 3,680,708 | 8/1972 | Luthi | 210/404 |

Primary Examiner—Samih N. Zaharna
Assistant Examiner—T. A. Granger
Attorney, Agent, or Firm—Robert R. Paquin; David W. Tibbot

[57] ABSTRACT

Unitary drainage sectors for rotary drum filtering apparatus, constructed whereby the drainage channels are enclosed within the sectors. Each sector may completely contain one or more of the drainage channels and/or the sectors may be formed such that, after assembly into a filter drum structure, laterally adjacent ones of the sectors cooperate to completely contain drainage channels.

14 Claims, 8 Drawing Figures

ROTARY DRUM FILTERING APPARATUS AND UNITARY DRAINAGE SECTORS THEREFOR

The present invention relates generally to rotary drum filtering apparatus and more particularly to the construction of drainage sectors for such filtering apparatus.

Conventionally, rotary drum filtering apparatus frequently has been constructed to include an annular drum peripherally carrying a multiplicity of drainage sectors, each of which is formed from a plurality of metal and/or plastic components welded, bolted or otherwise suitably afixed to one another. The drainage sectors of such apparatus are provided with drainage channels which open through the inner or bottom ends of the sectors and are closed along the sector inner ends by the drum after the sectors are mounted thereon. U.S. Pat. Nos. 3,306,457 and 3,306,460, both assigned to the assignee of the present invention, describe rotary drum filtering apparatus of this general construction.

Such prior conventional apparatus is, of course, normally entirely satisfactory in operation and capable of use in numerous applications including, for example, the filtering of pulp and paper making slurries and effluent. However, as in such prior apparatus the drainage channels are partially defined by the drum, leakage of liquid or filtrate between adjacent drainage channels may occur unless the inner ends of the sectors are sealingly on the drum. Moreover, such prior apparatus is expensive in construction and repair, primarily due to the large amount of labor required for the formation of the drainage sectors from their composite interconnected separate components. Hence, in those applications in which cost is of primary concern, the construction of the drainage sectors of such apparatus is disadvantagous. In addition, in those applications at locations where skilled labor and/or equipment necessary for repair of the drainage sectors may not be readily available, for example in underdeveloped countries, the construction of the drainage sectors of such prior apparatus is further disadvantageous.

Also, conventionally, rotary drum filtering apparatus sometimes has been constructed to include drainage sectors of molded plastic construction. Such molded plastic sectors of conventional apparatus, generally considered, however are of expensive, complex configuration and/or are not of strong, durable construction. Moreover, such prior molded plastic sectors are formed such that the drainage channels, rather than being included within the sectors, are arranged to longitudinally extend along faces of the sectors.

An object of the present invention is to provide a new and improved drainage sector for rotary drum filtering apparatus, which drainage sector is of strong, durable, unitary construction.

Another object of the invention is to provide a new and improved drainage sector of the type set forth which is relatively simple and economical in construction.

Another object is to provide a new and improved drainage sector of the type set forth which is particularly constructed and arranged such that the drainage channel is completely contained within the sector.

Another object is to provide a new and improved drainage sector of the type set forth which is particularly constructed and arranged whereby, when incorporated in rotary drum filtering apparatus, the sector is readily and simply replaceable.

A drainage sector constructed in accordance with the present invention may comprise unitary wall means containing a drainage channel within the sector, such wall means cooperating to cause the sector to be generally a ring sector in cross-section and including inner and outer walls on opposite sides of the drainage channel having sides remote from the drainage channel respectively bounding the inner and outer sides of the sector, one of such walls having its said side remote from said drainage channel arcuate and adapted to be supported on a rotary drum of a rotary drum filtering apparatus, the outer of such walls having drainage passage means therethrough in communication with the drainage channel for draining fluid thereto, and the sector including discharge passage means in communication with the drainage channel for discharging fluid from the sector.

Another object of the invention is to provide rotary drum filtering apparatus including new and improved drainage sectors of the type set forth.

A rotary drum filtering apparatus constructed in accordance with the invention may comprise an annulus of drainage sectors, such drainage sectors including drainage channels enclosed within said annulus, and such drainage sectors each being of unitary construction and including drainage passage means communicating with such drainage channels for supplying liquid thereto.

Other objects and advantages of the invention will be apparent from the following description taken in connection with the accompanying drawings wherein.

Figure 1:
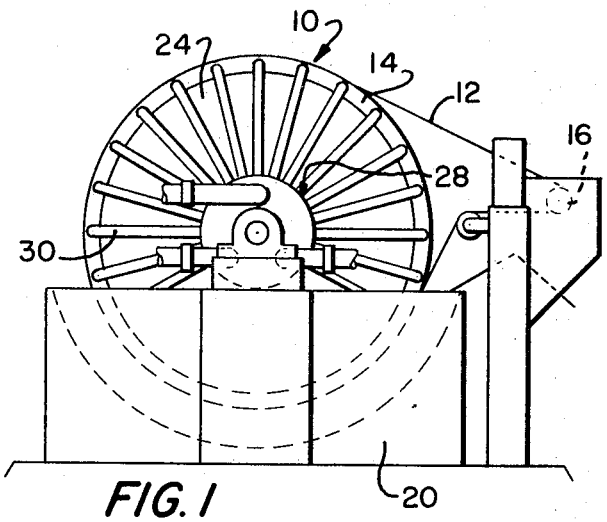
FIG. 1 is a elevational end view of a rotary drum filtering apparatus constructed in accordance with the invention.
Figure 2:
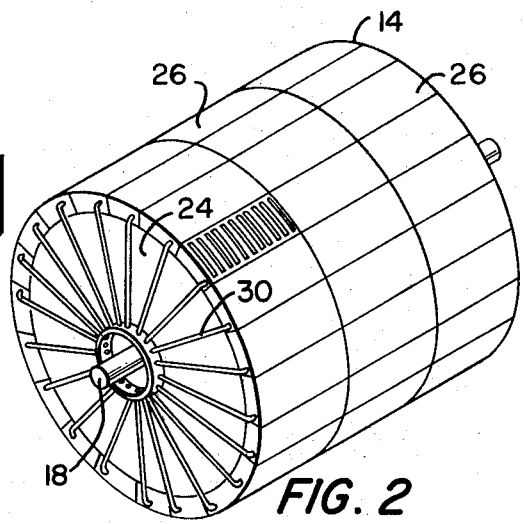
FIG. 2 is a view in perspective of the drum structure of the filtering apparatus shown in FIG. 1.

Referring more particularly to the drawings wherein similar reference characters designate corresponding parts throughout the several views, FIG. 1 illustrates a rotary drum filtering apparatus, designated generally as 10, which is of the type comprising a travelling, porous filter medium 12 wrapped around the drum structure 14 and also around a discharge roll 16 spaced from the drum structure 14. It will be understood, however, that this illustrated embodiment of the invention has been shown as a preferred form only, and the invention is not limited to application in rotary drum filtering apparatus comprising the illustrated travelling filter medium, but rather is equally applicable to rotary drum filtering apparatus wherein the filter medium is afixed circumferentially around the drainage sectors of the drum structure.

Figure 4:
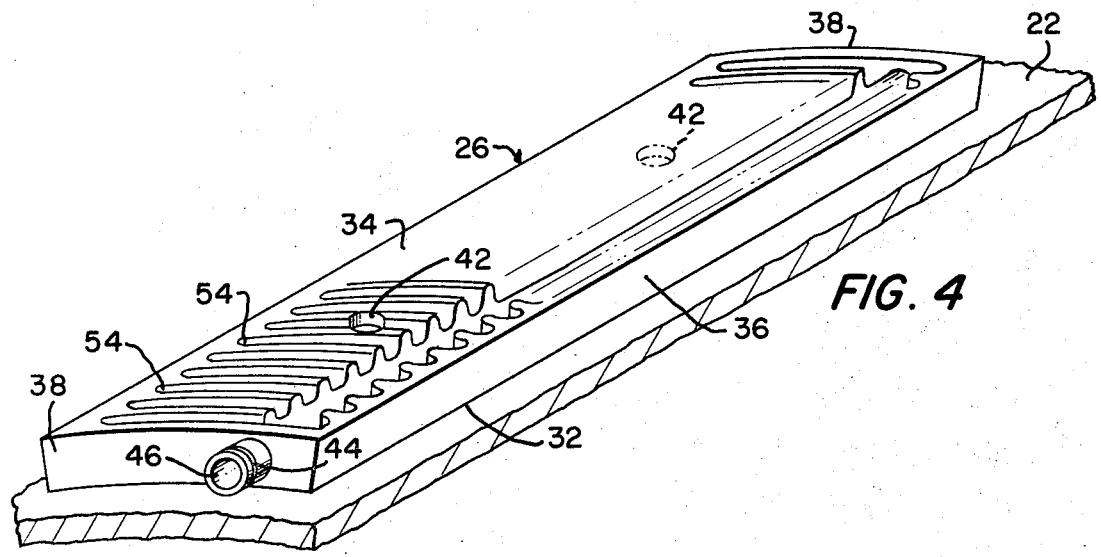
FIG. 4 is an enlarged, view in perspective of one of such drainage sectors and the adjacent portion of the therebelow supporting drum.

The drum structure 14 is carried by a rotatable supporting shaft 18 and, throughout the operation of the apparatus 10, rotatably driven partially submerged in a tank or vat 20 containing the pulp, effluent or slurry to be filtered. The drum structure 14 comprises the usual annular supporting drum, shown fragmentarily in FIG. 4 as 22, closed at its ends by end closure plates 24, and an annulus of drainage sectors, each designated generally as 26 mounted around the outer circumference of the drum 22.

As illustrated, the annulus of drainage sectors 26 is formed from a plurality of juxtaposed sets of end-to-end sectors 26, each of which sets comprises three end-to-end sectors 26 together extending longitudinally along the drum 22 the full length of the latter and having their drainage channels communicating with one another. The lengths and widths of the sectors 26 are, however, variable. Hence, it will be understood that the sectors 26 could be otherwise suitably arranged and/or the sectors 26 of each set could be alternatively of other suitable number, a single sector 26 even by itself extending the full length of the drum, if desired.

The filtering apparatus 10 is of the vacuum type and includes a conventional valve, designated generally as 28, separately connected to the drainage channels of each set of the sectors 26 through a pipe or conduit 30. The valve 28 in the conventional manner causes sub-atmospheric pressure or vacuum to be applied to the drainage channels of each set of the sectors 26 when the latter are below the level of the slurry in the vat 20, but cuts-off such sub-atmopsheric pressure or vacuum from the drainage channels of the sectors 26 when the latter are above the level of the slurry.

Figure 3:
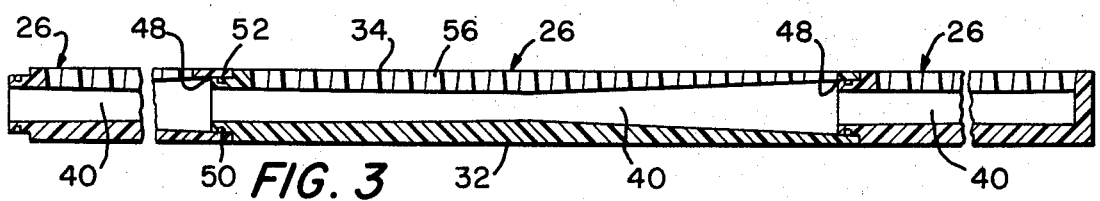
FIG. 3 is an enlarged, elevational sectional view taken longitudinally of such drum structure, showing a plurality of the therein included drainage sectors.

Each sector 26 is of integral construction and formed of suitable plastic material. Each sector 26 is elongated in the longitudinal direction of the drum 22 and comprises an elongated inner or bottom wall 32, and a elongated outer or top wall 34, elongated side walls 36 and end walls 38, such integral walls cooperating to therebetween contain the sector drainage compartment or enclosed channel 40 which longituidnally extends the full length of the sector 26 and is completely contained within the sector 26. The prefered configuration and dimensions of the drainage channel 40 are, of course, dependant upon numerous variables; however, as shown in FIG. 3, the drainage channel 40 may, if desired, be of varying cross-section. The filter medium 12 directly overlies and is supported on the outer surfaces of the outerwalls 34 of the sectors 26.

The inner wall 32 and the side walls 36 of each sector 26 are imperforate. The outer surface or side of the outer wall 34 of each sector 26 is formed of convex or outwardly bowed configuration; the outer surface or side of the inner wall 32 of each sectors 36 is formed with a concavity corresponding to the curve of the outer circumference of the drum 22. Hence, the walls 32, 34 of each sector 26 cooperate to cause the sector 26 to be of generally ring sector configuration in cross-section. The sectors 26 are individually detachably mounted to the outer circumference of the drum 22 by mounting bolts (not shown) inserted through mounting bolt openings 42 at spaced locations along their lengths.

The end wall 38 of each sector 26 most adjacent to the valve 28 includes an integral, outwardly projecting, neck 44 which contains a discharge passage 46 communicating with the drainage channel 40 of the sector 26 for discharging liquid or filtrate from the sector 26. The other or opposite end wall 38 of the sector 26 of each set most remote from the valve 28 is imperforate; however, the corresponding end walls 38 of each of the other two sectors 26 of each set include an opening 48 adapted to detachably receive the neck 44 of the thereadjacent sector 26. As illustrated, a seal ring 50 may be located in a seal ring groove 52 circumferentially around each neck 44 to prevent leakage at the connections of the discharge channels 40 of each set of the sectors 26. Hence, as will be seen the drainage channels 40 of the sectors 26 of each set are connected in series to the corresponding pipe 30 by the discharge passages 46 and the openings 48.

The outer wall 34 of each sector 26 is corrugated to include laterally extending, integral liquid or filtrate collecting grooves 54 at spaced locations throughout its length; and one or more drainage passages or openings 56 are formed through the thickness of such outer wall 34 at the bottom of each groove 54 to communicate the latter with the drainage channel 40 in the sector 26. Differential expansion occuring during the operation of the apparatus 10 may be accomodated either by providing an overall expansion allowance at one or both of the ends of each set of the sectors 26 or by interlocking the sectors 26 of each set with a slight clearance between the adjacent end walls 38 thereof. However, in those instances in which the drum 22 is foremd of a material similar to that of the sectors 26, no expansion allowance need be provided; and in such instances the sectors 26 may be even bonded to the drum 22.

During the operation of the apparatus 10, the filter medium 12 is continuously longitudinally driven and the drum structure 14 is continuously rotated. Sub-atmospheric pressure is applied by the valve 28 through the pipes 30 to the drainage channels 40 of each set of the sectors 26 when the latter are below the level of the slurry in the vat 20 to facilitate filter cake build-up on the filter medium 12, such sub-atmospheric pressure being cut-off from the drainage channels 40 of the sets of the sectors 26 when the latter are rotated above the level of the slurry. The liquid or filtrate flowing inwardly through the filter medium 12 flows into the collecting groove 54 which direct such liquid laterally of the drainage sectors 26 to the communicating drainage passages 56 from whence it is discharged to the communicating drainage channel 40 and pipe 30.

Figure 5:
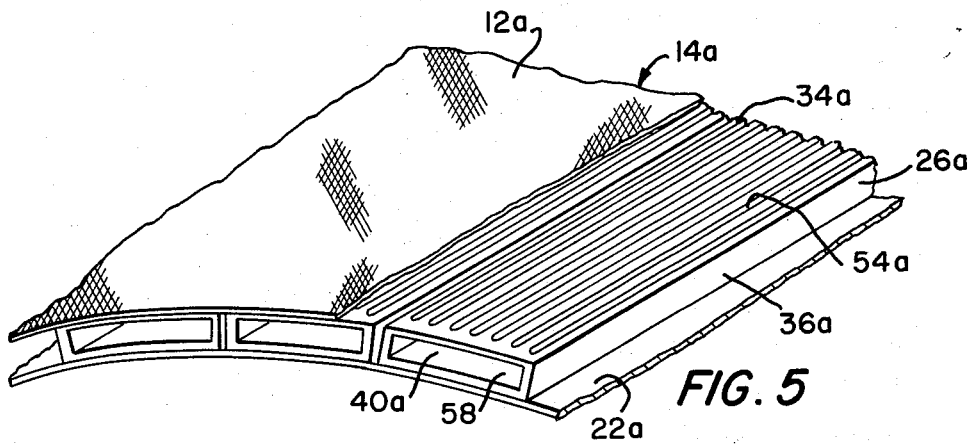
FIG. 5 is a perspective view fragmentarily illustrating a drum structure including a plurality of drainage sectors constructed in accordance with an alternative embodiment of the invention.

FIG. 5, wherein parts similar to those aforedescribed are designated by the corresponding reference numerals followed by the suffix a, fragmentarily illustrates a drum structure 14a comprising juxtaposed, plastic drainage sectors 26a which could advantageously be formed by the extrusion process, thereby enabling the sectors 26a to each be constructed of a length the same as that of the drum 22a. The drainage sectors 26a are each at one end closed by suitable sealing means (not shown), but have their other ends completely open to serve as relatively large discharge passages 58 for discharging the liquid or filtrate from their drainage compartments or enclosed channels 40a. The outer surfaces of the outer walls 34a of the sectors 26a are formed with integral filtrate collecting grooves 54a extending longitudinally of the sectors 26a, and hence longitudinally of the drum 22a, such grooves 54a communicating through openings (not shown) in the outer walls 34awith the drainage channels 40a of their respective sectors 26a. Except as aforedescribed, however, the drainage sectors 26 *a* are in all material respects similar to the sectors 26.

Figure 6:
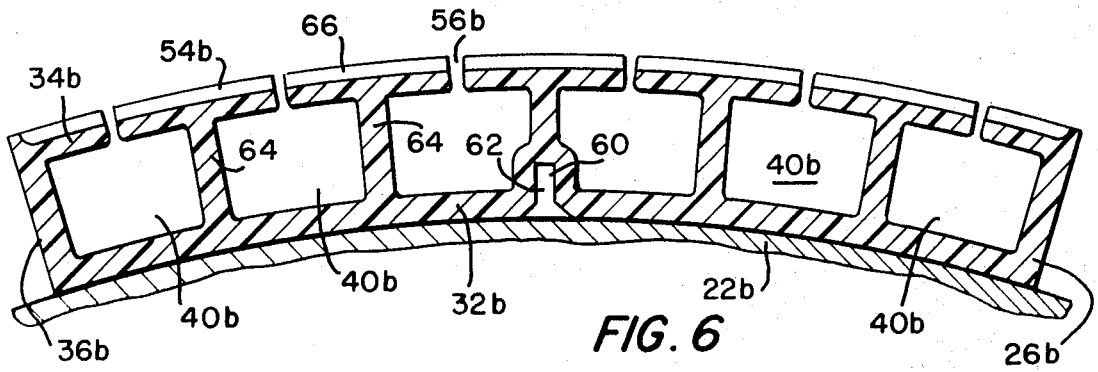

FIG. 6, wherein parts similar to those aforedescribed are designated by the corresponding reference numerals followed by the suffix *b*, illustrates a drainage sector 26*b* wherein the inner wall 32*b* includes a slot 60 adapted to receive a drum carried key 62 to mount the sector 26*b* to the drum 22*b*. The slot 60 and its received key 62 may extend the full length of the sector 26*b* or, alternatively, a plurality of shorter slots 60 and corresponding keys 62 may be provided. The sector 26*b*, moreover, includes integral, intermediate walls 64 which extend longitudinally of the sector 26*b* thoughtout the length thereof and divide the space within the sector 26*b* into a plurality of separate, juxtaposed drainage compartments or enclosed channels 40*b*, all completely contained within the sector 26*b*. The outer wall 34*b* of the sector 26*b* is formed to include a plurality of sections separated by therebetween, elongated drainage passages 56*b*; and the the outer wall 34*b* comprises integral, laterally extending grooves 54*b*, spaced by ribs 66 which are integral with the wall 34*b* and the ribs 64. The sector 26*b* is formed of one-piece plastic construction, preferably by the extrusion process, and, except as aforedescribed, is similar to the prior described sector 26.

Figure 7:
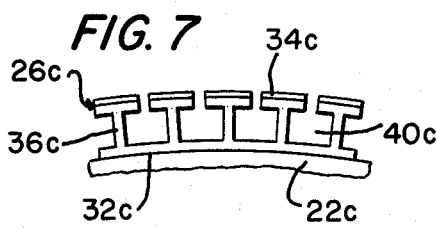
FIGS. 6 through 8 are elevational views fragmentarily illustrating drum structures including other alternative embodiments of the drainage sector of the invention.

FIG. 7, wherein parts similar to those aforedescribed are designated by the corresponding reference numerals followed by the suffix *c*, illustrates another plastic drainage sector 26*c* which is of a construction generally similar to that of the sector 26*b*, but different therefrom in that the inner and outer side walls 32*c*, 34*c* include portions projecting outwardly from each of the opposite edges of the sector 26*c*. Due to these projecting portions of the walls 32*c*, 34*c*, when a multiplicity of the sectors 26*c* are arranged in juxtaposed relationship to form an annulus of the sectors 26*c*, laterally adjacent ones of the sectors 26*c* cooperate to therebetween provide a drainage compartment or channel which is completely enclosed within the annulus by their adjacent walls 36*c* and said projecting portions of their walls 32*c*, 34*c*. The sector 26*c*, as will be seen, may again be advantagenously manufactured by the extrusion process.

Figure 8:
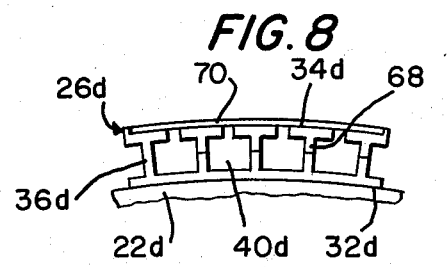

FIG. 8, wherein parts similar to those aforedescribed are designated by the suffix *d*, illustrates yet another plastic drainage sector 26*d* which may be formed through the employment of extrusion molding. The sector 26*d* is generally similar to the beforedescribed sector 26*b*, but different therefrom in that the intermediate walls 64 include openings 68 forming the space within the sector 26*d* into a single drainage compartment or channel 40*d* and such channel 40*d* opens through one of the sector side walls 36*d*. Hence, when a multiplicity of such sectors 26*d* are arranged in juxtaposed relationship to form an annulus of the sectors 26*d*, one side of the channel 40*d* within each sector 26*d* is closed in the annulus by a side wall 36*d* of the next adjacent sector 26*d*. Also, as will be noted, the sector 26*d* includes laterally extending rib elements 70 which are affixed thereto be unitary therewith, such rib elements 70 bounding the outer side walls 34*d* of the sectors 26*d* and defining drainage openings (not shown) communicating with the drainage channel 40*d*.

The operation of rotary drum filtering apparatus including the drainage sectors 26*a*, 26*b*, 26*c*, 26*d* is believed to be apparent from the beforegiven description.

From the preceeding description, it will be seen that the present invention provides strong, durable, unitary drainage sectors of relatively simple construction capable of being mass produced on a economical basis. It will be also seen that the drainage channels of the sectors are molded intregal with such sectors, thereby avoiding the expense inherent in the event that the channels were formed as portions of the supporting drum. Moreover, it will further be seen that individual ones of the sectors, or sets of the sectors, may, as desired or required, be readily and simply removed from rotary drum filtering apparatus and replaced.

It will be understood, however, that, although only a few embodiments of the invention have been illustrated and hereinbefore specifically described, such embodiments have been given by way of illustration only and the invention is not limited merely to such few embodiments, but rather contemplates other embodiments and variations within the scope of the following claims.

Having thus described my invention, I claim:

1. A drum structure for rotary drum filtering apparatus, comprising an annular supporting drum and an annulus of drainage sectors mounted around the outer circumferential surface of said supporting drum, each of said sectors being of unitary construction and comprising integral wall means defining a drainage channel within the sector, said wall means of each said sector cooperating to cause the sector to be generally a ring sector in cross-section, said wall means of each sector including integral inner and outer walls on opposite sides of the said drainage channel of the sector and said inner and outer walls having sides remote from such drainage channel respectively bounding the inner and outer sides of the sector, said inner wall of each said sector being generally concave on its said side remote from the drainage channel and having its said side supported on the outer circumference of said supporting drum, said inner wall of each said sector being imperforate, said outer wall of each said sector being generally convex on its said side remote from the drainage channel, said outer wall of each said sector having drainage passage means therethrough in communication with the said drainage channel of the sector for draining fluid thereto, and each said sector including discharge passage means in communication with its said drainage channel for discharging fluid from the sector.

2. A drum structure according to claim 1, wherein at least one edge of a drainage channel of each said sector is closed by a laterally adjacent sector.

3. A drum structure according to claim 1, wherein pluralities of said sectors are disposed end to end with their drainage channels in communication with one another.

4. A drum structure according to claim 1, wherein said inner and outer walls of each said sector have sides respectively defining the inner and outer sides of the said drainage channel of the sector.

5. A drum structure according to claim 1, wherein a said drainage channel of each said sector is completely contained within the sector.

6. A drum structure for rotary drum filtering apparatus, comprising a supporting drum and annulus of drainage sectors mounted around the outer circumference of said drum, each said sector being of unitary plastic construction and comprising integral walls defining at least one drainage channel within the sector, said walls of each said sector cooperating to cause the sector to be generally a ring sector in cross-section and including integral inner and outer walls on opposite sides of the said drainage channel of the sector, said inner and outer walls of each said sector having sides remote from the drainage channel of the sector respectively bounding the inner and outer sides of the sector, each said outer wall being generally convex along its said side remote from said drainage channel and each said inner wall being imperforate and generally concave along its said side remote from said drainage channel, each said inner wall having its said side mounted arcuately around the outer circumference of said supporting drum, said inner and outer walls of each said sector being elongated longitudinally of said supporting drum to cause the sector to be elongated longitudinally of said drum, said outer wall of each said sector having drainage passage means therethough in communication with the said drainage channel of the sector for supplying liquid to the latter, and each said sector at one of its ends having discharge passage means in communication with its said drainage channel for discharging liquid from the sector.

7. A drum structure according to claim 6, wherein at least one edge of a drainage channel of each said sector is closed by a laterally adjacent sector.

8. A drum structure according to claim 6, wherein pluralities of said sectors are disposed end to end with the drainage channels of the end to end sectors in communication with one another.

9. A drum structure according to claim 8, wherein said end to end sectors are interlocked one with another.

10. A drum structure according to claim 6, wherein a said drainage channel of each sector is completely enclosed within the sector.

11. A drum structure according to claim 6, wherein said convex side of said outer side wall of each said sector contains grooves communicating with the said drainage passage means of the sector for supplying liquid thereto.

12. A drum structure according to claim 6, wherein said inner and outer walls of each said sector have sides respectively defining the inner and outer sides of the said drainage channel of the sector.

13. A drum structure according to claim 6, wherein said inner walls of said sectors and said supporting drum include keys and key receiving slots cooperative for mounting said sectors to said supporting drum.

14. A drum structure according to claim 13, wherein said inner walls include said key receiving slots and said supporting drum includes said keys.

* * * * *